(12) United States Patent
Jiang et al.

(10) Patent No.: US 11,571,689 B2
(45) Date of Patent: Feb. 7, 2023

(54) SYNTHESIS STRATEGY OF SUPPORTED TRANSITION METAL CARBIDES FENTON-LIKE CATALYSTS AND APPLICATION THEREOF

(71) Applicant: TONGJI UNIVERSITY, Shanghai (CN)

(72) Inventors: Yue Jiang, Shanghai (CN); Sijie Lin, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 45 days.

(21) Appl. No.: 16/987,352

(22) Filed: Aug. 6, 2020

(65) Prior Publication Data
US 2021/0283592 A1    Sep. 16, 2021

(30) Foreign Application Priority Data

Mar. 16, 2020 (CN) .......................... 202010182668.8

(51) Int. Cl.
*B01J 37/02* (2006.01)
*B01J 27/22* (2006.01)
*B01J 35/02* (2006.01)
*B01J 37/06* (2006.01)

(52) U.S. Cl.
CPC .......... *B01J 37/0205* (2013.01); *B01J 27/22* (2013.01); *B01J 35/02* (2013.01); *B01J 37/0213* (2013.01); *B01J 37/06* (2013.01)

(58) Field of Classification Search
CPC ........ B01J 37/0205; B01J 27/22; B01J 35/02; B01J 37/0213; B01J 37/06

USPC ......................................................... 502/177
See application file for complete search history.

(56) References Cited

U.S. PATENT DOCUMENTS

2018/0309125 A1* 10/2018 Beidaghi ............... H01M 4/463

FOREIGN PATENT DOCUMENTS

| CN | 108043238 A | * | 5/2018 | ......... B01D 67/0079 |
| CN | 108786870 | | 11/2018 | |
| CN | 108786870 A | * | 11/2018 | .............. B01J 27/22 |

(Continued)

OTHER PUBLICATIONS

Haridas B. Parse et al., "Mixed phase titanium carbide (Ti—C—Tx): A strategy to design a significant electrocatalyst for oxygen electroreduction and storage application." Applied Surface Science 458, pp. 819-826. (Year: 2018).*

*Primary Examiner* — Patricia L. Hailey
(74) *Attorney, Agent, or Firm* — JCIP Global Inc.

(57) ABSTRACT

The invention is mainly related to a synthesis method of supported two-dimensional transition metal carbides for Fenton-like catalysis, which includes the following steps: (1) preparing two-dimensional transition metal carbides powders; (2) dispersing the two-dimensional transition metal carbides powders into intercalants solution to perform an intercalation reaction, and then centrifuging, washing, and freeze-drying to obtain intercalated products; (3) dispersing a certain quality previously obtained intercalated powders into ultrapure water and heating for pre-reaction, and then adding hydrogen peroxide solution to the pre-reacted mixed solution under ice-water bath for secondary etching, resting, centrifuging and gently decanting a supernatant to obtain the final Fenton-like catalysts.

10 Claims, 2 Drawing Sheets

(56) References Cited

FOREIGN PATENT DOCUMENTS

| | | | | |
|---|---|---|---|---|
| CN | 109133062 A | * | 1/2019 | ............ C01B 32/921 |
| WO | WO-2016049109 A2 | * | 3/2016 | ............ C01B 32/914 |

* cited by examiner

SYNTHESIS STRATEGY OF SUPPORTED TRANSITION METAL CARBIDES FENTON-LIKE CATALYSTS AND APPLICATION THEREOF

CROSS-REFERENCE TO RELATED APPLICATION

This application claims the priority benefit of China application serial no. 202010182668.8, filed on Mar. 16, 2020. The entirety of the above-mentioned patent application is hereby incorporated by reference herein and made a part of this specification.

BACKGROUND

Technical Field

The invention is related to the preparation technology field of Fenton/Fenton-like catalysts, especially to a synthesis strategy and application of supported transition metal carbides for Fenton-like catalysis, with high-dispersity and uniformity, high degree of atomic defect, and excellent catalytic performance.

Description of Related Art

Photocatalysis has been a tremulously focus over the past three decades due to its attractive solar energy conversion ability for environmental remediation. However, under low light (deep water) or dark conditions, traditional photocatalysts have limited activity due to low solar energy utilization and poor quantum efficiency. Advanced oxidation processes (AOP), especially iron-based Fenton catalysis, has attracted considerable attention in both scientific and industrial applications due to their potential in dealing with the ever-growing environmental pollutants. Typically, a significant amount of highly oxidizing radical species (e.g. hydroxyl radicals) are generated by the catalytic reaction of Fe(II)/Fe (III) in the presence of hydrogen peroxide. The key drawbacks of the traditional iron-based homogeneous Fenton system include iron leaching, sludge formation, and narrow work pH range. Besides, the conventional decomposition efficiency of $H_2O_2$ is limited by the low reaction rate constant of the Fe(III)/Fe(II) cycle, resulting in the consumption of a large amount of $Fe^{2+}$ (18-410 mmol·$L^{-1}$) and $H_2O_2$ (30-6,000 mmol·$L^{-1}$) to achieve degradation of organic pollutants. Moreover, the physical and chemical properties of water and soil media may be affected by the violent exothermic and bubbling phenomenon caused by the excessive use of $H_2O_2$ during the reaction. Therefore, it is necessary to design synthesis novel, efficient and environment-friendly Fenton-like catalysts for environmental applications with wide pH range, towards the goal of clean water, clean air, clean soil and clean energy.

MXenes, as a new category of graphene-like two-dimensional transition-metal carbides, nitrides, and carbonitrides, has attracted interdisciplinary attention since the pioneering $Ti_3C_2$ work by Naguib et al. Benefitting from the fascinating properties of high electrical and metallic conductivity (6,000-8,000 S·$cm^{-1}$), large surface area, hydrophilic nature, superb carrier anisotropic mobility, and tunable band structure. $M_{n+1}X_nT_x$ (where M is an early transition metal, X is carbon and/or nitrogen, $T_x$ refers to the surface functional groups (e.g., O, OH, and/or F) and n=1, 2, or 3) and its composite have been used in a variety of applications, including electrochemical energy storage in supercapacitors and batteries, photothermal conversion, membrane separation, and catalysis. However, the current synthesis methods are relatively complex with high cost, which usually require a reducing atmosphere ($H_2$) or high temperature. It is of great significance to develop a facile and mild strategy to synthesize the Fenton-like catalysts on the basis of making full use of the advantages of the two-dimensional material MXenes.

The homogeneous Fenton process, however, has some drawbacks due mainly to the difficulty for separation and reuse, and may even bring heavy metal ions pollution. Afterwards, the heterogeneous Fenton-like oxidation is suggested to be an alternative to improve these defects, in which supported iron catalysts are widely used (e.g., graphitic carbon nitride (g-$C_3N_4$) and transition-metal dichalcogenides (TMDs)), yet the catalytic growth is usually carried out in an unconfined space where results in poorly controlled growth and the generation of nanoparticles with large diameters (hundreds of nanometers—micrometers). In principle, aggregation and low numbers of exposed active sites are not conducive to electron transfer and suffer from the low level of reactive oxygen species which will sacrifice the high activities in homogeneous catalysis. Maximizing the dispersion degree of the active sites will greatly improve the activity of Fenton-like catalysis. Hence, the development of a new simple and safety atomic-clusters and nanodots catalytic strategy to construct MXene composites with favorable atomically dispersed active sites structures for high-performance Fenton-like catalysis and further insight into the underlying mechanism are highly desirable.

Chinese patent CN 108786870 A disclosed a preparation method and application of a titanium-based photo-Fenton-like catalyst. The preparation method includes the following steps: (1) dispersing the $Ti_3AlC_2$ powders into the hydrofluoric acid solution to perform the etching reaction, and then centrifuging, washing, and freeze-drying to obtain the first product; (2) dispersing the obtained first product powders into solvent under stirred condition, adding the hydrogen peroxide solution to the mixed solution and resetting at room temperature, and then diluting with solvent, centrifuging and gently decanting the supernatant to obtain the target catalysts. The catalyst was a composite of titanium oxide/porous single $Ti_3C_2$ flake, wherein the transition metal titanium species were partially oxidized into titanium oxide and the porous skeletons of the $Ti_3C_2$ flakes were formed due to shedding of partial titanium oxide. However, the yield, uniformity and number of the catalytic sites of this patent needed to be further improved in order to achieve high-performance Fenton-like catalysis.

SUMMARY

The invention is proposed to provide a synthesis strategy and application of supported transition metal carbides for Fenton-like catalysis, with high-dispersity and uniformity, high degree of atomic defect, and excellent catalytic performance, which can overcome the above-mentioned defects, such as low catalytic activity and aggregation.

The object of the invention can be achieved by the following technical solutions:

A synthesis method of Fenton-like catalysts, which is mainly related to supported two-dimensional transition metal carbides, the method comprising as follows:

(1) preparing two-dimensional transition metal carbides powders;

(2) dispersing the two-dimensional transition metal carbides powders into intercalants solution to perform an intercalation reaction, and then centrifuging, washing, and freeze-drying to obtain intercalated products;

(3) dispersing a certain quality previously obtained intercalated dry powder into ultrapure water and heating for pre-reaction, and then adding hydrogen peroxide solution to the pre-reacted mixed solution under ice-water bath for secondary etching, resting, centrifuging and gently decanting a supernatant to obtain the final Fenton-like catalysts.

Among them, the transition metal in the catalyst is a variable valence transition metal element, preferably one or more of Ti, V, Nb, Mo, or Ta.

In step (1), a method for preparing the two-dimensional transition metal carbides powders comprises: adding a ternary layered MAX phase ceramic material to hydrofluoric acid (HF) at room temperature along with magnetic stirring to remove the Al layer, which nitrogen ($N_2$) is passed into a system, aiming to exhaust oxygen and prevent oxidation, centrifuging a suspension, washing with ethanol and deionized water, and freeze-drying to obtain the two-dimensional transition metal carbides powders.

In step (1), a mass-volume ratio of the ternary layered MAX phase ceramic material and the hydrofluoric acid solution is 1-10 g:18-100 mL.

In step (1), a mass concentration of the hydrofluoric acid solution is 10%-49%.

In step (1), the etching reaction is along with magnetic stirring for 12-120 h at room temperature, and the obtained two-dimensional transition metal carbides powders are freeze-dried under the condition of −30° C.-50° C. for 48-60 h.

In step (2), a mass-volume ratio of the two-dimensional transition metal carbides powders and the intercalants solution is 0.5-10 g:20-50 mL, and the intercalants solution is tetrapropylammonium hydroxide solution.

In step (2), a mass concentration of the tetrapropylammonium hydroxide solution is 20%-50%.

In step (2), the intercalation reaction is along with magnetic stirring for 12-72 h at room temperature.

In step (2), the obtained intercalated powders are freeze-dried under the condition of −30° C.-50° C. for 48-60 h.

In step (3), a mass-volume ratio of the intercalated products and the ultrapure water is 0.05-0.5 g: 10-50 mL.

In step (3), the pre-reaction is heated in an oil bath along with magnetic stirring for 10-30 min, and a reaction temperature is 30-50° C.

Wherein in step (3), a mass-volume ratio of the intercalated products and the hydrogen peroxide solution is 0.05-0.5 g:0.5-5 mL, and a mass concentration of the hydrogen peroxide solution is 10%-50%.

In step (3), a resting time is 30-60 min.

In step (3), a speed of centrifugation is 8000-12000 rpm, and a centrifugation time is 10-30 min.

In step (3), all required concentrations of the experimental solutions are diluted with the ultrapure water which is produced from GenPure Pro UV/UF-TOC device (18.20 MΩ·cm$^{-1}$ at 25° C.).

The invention provides a synthesis method for supported two-dimensional transition metal carbides Fenton-like catalysts, which has potential application value in catalytic degradation of organic pollutants in water or soil mediums under dark conditions.

Herein, the liquid catalyst is through a novel, general, and facile fabrication route for direct in situ super-growth of high-uniformity ultra-small clusters (~2 nm) and nanodots (~5 nm) active sites within a fragmented silk-like amorphous carbon framework, whose thickness is about 1 nm. Meanwhile, the $MO_x$ active sites express the features of high-dispersity and uniformity and high degree of defect for Fenton-like catalysis (M is Ti, V, Nb, Mo, or Ta).

During the preparation process, the preparation of the two-dimensional transition metal carbide powders is performed in nitrogen rather than oxygen. The main reason is that the oxygen-free atmosphere will allow the material to be etched more fully, and further avoid oxidation problems during the etching process. The invention uses tetrapropylammonium hydroxide as an intercalating agent, which further improves the interlayer spacing and exposed area of the two-position transition metal carbide powder and provides more convenient conditions for subsequent $H_2O_2$ etching later. The synthesis process is carried out under ice-water bath rather than room temperature. Mild reaction is conductive to the formation of high-uniformity ultra-small catalytic sites. Trying to make the reaction more adequate, the $H_2O_2$ etching time is also extended from 5-20 min to 30-60 min and the large particles are centrifuged by high-speed centrifugation. In addition, the drying process of the invention is all selected as freeze-drying, which has less damage to samples than vacuum heating drying and reduces the risk of secondary oxidation of the catalytic sites. Meanwhile, this method can be extended to other members of the MXenes family (e.g., $V_2C$, $Nb_2C$, $Ta_2C$ and $Mo_3C_2$) and opens new avenues for the facile design and manipulation of functional Fenton-like catalysts.

Compared with other methods, the invention has the following advantages:

(1) This invention has more advantages of high reactivity, low cost, well stability and reusability, and easy conversion compared with other techniques. Meanwhile, high-uniformity ultra-small catalytic sites are particularly efficient for Fenton-like catalysis.

(2) The as-prepared supported two-dimensional transition metal carbides Fenton-like catalyst could work with high efficiency in a wide pH range from 1 to 11 for organic pollutants, e.g., dye or pesticide (e.g., Atrazine), which was a significant improvement over traditional Fenton catalyst, e.g. $Fe^{2+} \leftrightarrows Fe^{3+}$. In addition, the iron leaching, sludge formation and other secondary pollutions will not occur in the reaction process.

(3) The as-prepared supported two-dimensional transition metal carbides Fenton-like catalyst has excellent mass transfer due to its hydrophilic nature and liquid state, which expresses a better potential application value in soil remediation.

(4) The invention provides a synthesis method for supported two-dimensional transition metal carbides Fenton-like catalysts, which has potential application value in catalytic degradation of organic pollutants in water or soil mediums under dark conditions. Meanwhile, this method can be extended to other members of the MXenes family (e.g., $V_2C$, $Nb_2C$, $Ta_2C$ and $Mo_3C_2$) and opens new avenues for the facile design and manipulation of functional Fenton-like catalysts.

DESCRIPTION OF THE EMBODIMENTS

Figure 1:
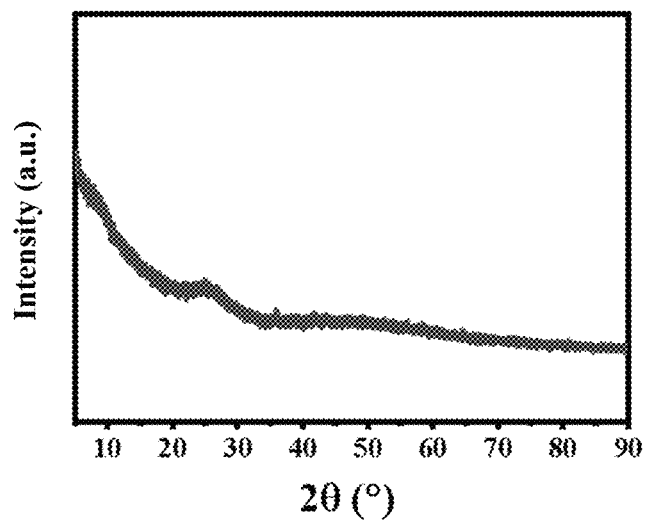
FIG. 1 is X-ray diffraction patterns of supported titanium-based Fenton-like catalyst.

The invention will be described in detail in combination with specific examples. The following examples will help researchers to further understand this invention and not be limited to the example embodiments set forth herein. However, this disclosure may be embodied easily by those who have common knowledge in the related art, these all belong to the protection scope of the present invention.

An in-situ oxidation synthesis method of Fenton-like catalysts, which is mainly related to supported two-dimensional transition metal carbides, comprising as follows:

(1) A synthesis and delamination of multilayer two-dimensional transition metal carbides were achieved by a liquid exfoliation method using hydrofluoric acid (HF) etching. Briefly, 1-10 g ternary layered MAX phase ceramic materials were added to 18-100 mL of 10-49 wt % hydrofluoric acid (HF), which passed nitrogen ($N_2$) into a system for 30 min, aiming to exhaust oxygen and prevent oxidation, at room temperature along with magnetic stirring for 12-120 h to remove the Al layer (Rotation speed is 300 rpm). A suspension was then centrifuged, followed by washing with ethanol and deionized water until pH>6. Finally, the obtained two-dimensional transition metal carbides powders were freeze-dried under the condition of −30° C.-50° C. for 48-60 h and stored at 4° C.

(2) The two-dimensional transition metal carbides powders were dispersed into tetrapropylammonium hydroxide (TPAOH) intercalants solution to perform an intercalation reaction. Briefly, 0.5-10 g of the previously obtained two-dimensional transition metal carbides powder was stir-mixed with 20-50 mL of 20-50 wt % TPAOH for 12-72 h at room temperature, followed by collecting after centrifugation (Rotation speed is 300 rpm) with washing by ethanol and deionized water for three times until pH>6. A final aqueous dispersion was freeze-dried under the condition of −30° C.-50° C. for 48-60 h to obtain intercalated products.

(3) In the process, 0.05-0.5 g previously obtained intercalated powder was dispersed in 10-50 mL deionized water by magnetic stirring near room temperature (30-50° C.) for 10-30 min. Then 0.5-5 mL, 10-30% $H_2O_2$ was added, kept below 277 K under ice-water bath for 30-60 min, the resulting dispersion was centrifuged for 10-30 min at 8000-12000 rpm, and a supernatant of the final products was gently decanted to obtain the Fenton-like catalysts.

Among them, the transition metal in the catalyst is a variable valence transition metal element, preferably one or more of Ti, V, Nb, Mo, or Ta.

During the preparation process, the ternary layered MAX phase ceramic materials corresponding to different two-dimensional transition metal carbides are as follows:

The corresponding raw material for $Ti_3C_2$ is $Ti_3AlC_2$, $V_2C$ is $V_2AlC$, $Nb_2C$ is $Nb_2AlC$, $Ta_2C$ is $Ta_2AlC$, and $Mo_3C_2$ is $Mo_3AlC_2$, respectively.

The invention provides a synthesis method for supported two-dimensional transition metal carbides Fenton-like catalysts, which has potential application value in catalytic degradation of organic pollutants in water or soil mediums under dark conditions.

Herein, the catalyst prepared by the method of the invention is a liquid catalyst that is through a novel, general, and facile fabrication route for direct super-growth of high-uniformity ultra-small clusters (~2 nm) and nanodots (~5 nm) active sites in situ within a fragmented silk-like amorphous carbon framework, whose the thickness is about 1 nm. Meanwhile, the $MO_x$ active sites express the features of high-dispersity and high-uniformity and high degree of defect for Fenton-like catalysis.

This invention has more advantages of high reactivity, low cost, well stability and reusability, wide pH range, and easy conversion compared with other techniques, which has potential application value in water quality, air purification, soil remediation and new energy resources fields.

Hereinafter, the present inventive concepts will be described in more details with reference to the following Examples and attached Figures.

Example 1

A novel preparation method of supported titanium-based Fenton-like catalyst for highly reactive and stable catalytic degradation of a series of organic pollutants under the dark filed through the advanced oxidation technology. The method comprising as follows:

(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into a system for 30 min, aiming to exhaust oxygen and prevent oxidation, at room temperature along with magnetic stirring for 12 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.

(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 12 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.

(3) In the process, 0.10 g previously obtained $Ti_3C_2$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

As shown in FIG. 1, X-ray diffraction didn't show any signal about Anatase or Rutile, which further confirmed a highly disordered structure inside or primarily because of the insensitivity to small catalytic sites.

Figure 2:
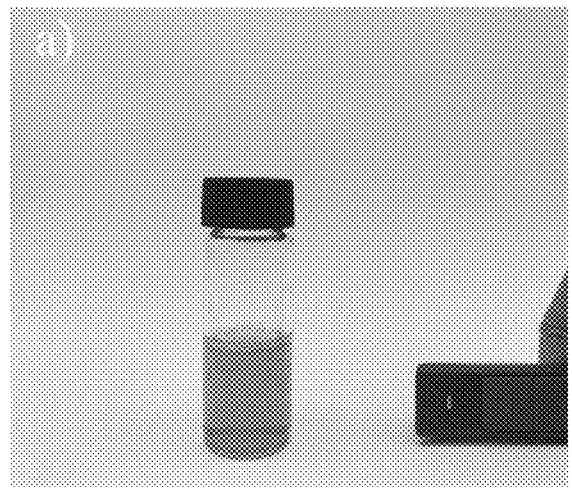
FIG. 2 is a digital photo of supported titanium-based Fenton-like catalyst.
Figure 3:
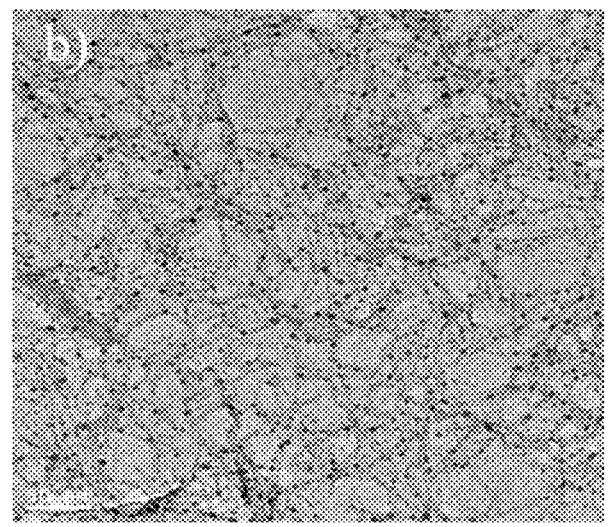
FIG. 3 is a representative TEM image of supported titanium-based Fenton-like catalyst.

As shown in FIG. 2, the prepared catalyst could be well dispersed in water with typical Tyndall effect for several months, which indicated their excellent hydrophilicity and dispersity. As can be seen from FIG. 3, atomically dispersed high-uniformity ultra-small $TiO_{1.47}$ clusters (~2 nm) and nanodots (~5 nm) active sites in situ anchored on fragmented silk-like amorphous carbon framework (AD-$TiO_{1.47}$/A-carbon).

Figure 4:
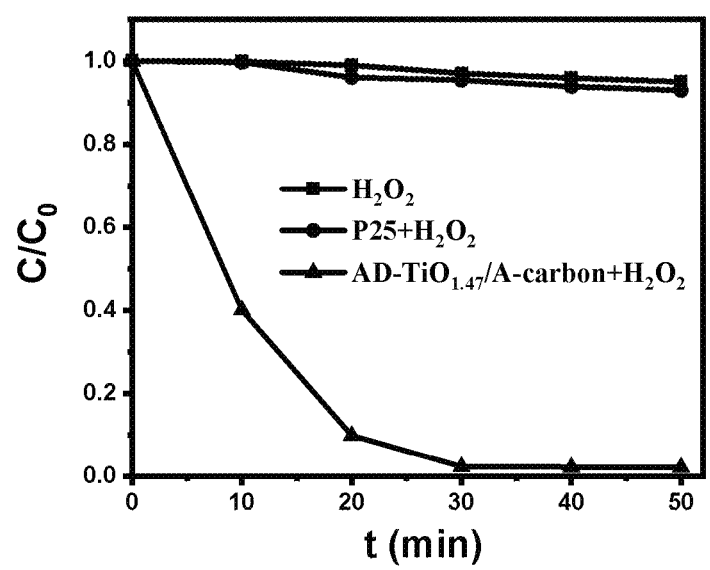
FIG. 4 is a Fenton-like catalytic performance of supported titanium-based Fenton-like catalyst towards atrazine under dark.

ATZ was chosen to screen the optimized catalyst and assess the catalytic performance of the as-prepared sample for Fenton-like activation. In a typical degradation process, a determined amount of powder catalyst was mixed into 20 mL, 5 mg·L$^{-1}$ ATZ solution. The mass of comparison samples was determined according to the concentration of the titanium element of AD-TiO$_{1.47}$/A-carbon, which we confirmed all these Ti species could contribute to the Fenton-like reaction. In this system, the final concentration of Ti element was 100 mg·L$^{-1}$. Thereafter, the 5 mM of H$_2$O$_2$ was introduced into the solution to initialize the reaction. At pre-specified time intervals (0, 10, 20, 30, 40 and 50 min), 2 mL reaction solution was withdrawn from each tube and quenched by 2 mL 1.5 mM Na$_2$SO$_3$ solutions immediately (1:1). Afterwards, the solutions were filtered with 0.22 μm membrane to remove impurity solids and send for high performance liquid chromatography (HPLC) analysis to measure ATZ concentration. Specially, the AD-TiO$_{1.47}$/A-carbon should be separated from the catalyst-pollutant solution using Waters Oasis HLB SPE columns (3 cc/60 mg, 30 um). All catalytic experiments were at least carried out in duplicates with standard errors reported. As shown in FIG. 4, as high as 95% ATZ removal could be achieved in 30 min using AD-TiO$_{1.47}$/A-carbon as the catalyst, yet the rest of as-prepared samples and H$_2$O$_2$ alone hardly degrade the pollutants.

Example 2

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 1.00 g MAX phase Ti$_3$AlC$_2$ powder was added to 18 mL of 40 wt % hydrofluoric acid (HF), which passed nitrogen (N$_2$) into a system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 72 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 30% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 3

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 1.00 g MAX phase Ti$_3$AlC$_2$ powder was added to 18 mL of 40 wt % hydrofluoric acid (HF), which passed nitrogen (N$_2$) into a system for 30 min, aiming to exhaust oxygen and prevent oxidation, at room temperature along with magnetic stirring for 120 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 10.00 g of the previously obtained Ti$_3$C$_2$ dry powder was stir-mixed with 50 mL TPAOH for 72 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 30% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 4

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 5.00 g MAX phase Ti$_3$AlC$_2$ powder was added to 90 mL of 40 wt % hydrofluoric acid (HF), which passed nitrogen (N$_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 30% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 5

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer $Ti_3C_2$ were achieved by a liquid exfoliation method using hydrofluoric acid (HF) etching. Briefly, 10.00 g MAX phase $Ti_3AlC_2$ powder was added to 100 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.
(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.
(3) In the process, 0.10 g previously obtained $Ti_3C_2$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 6

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.
(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.
(3) In the process, 0.05 g previously obtained $Ti_3C_2$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 7

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.
(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.
(3) In the process, 0.10 g previously obtained $Ti_3C_2$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 8

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.50 g previously obtained Ti$_3$C$_2$ MXene dry powder was dispersed in 50 mL deionized water by magnetic stirring near room temperature (30° C.) for 10 min. Then 1 mL, 30% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 9

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 1.00 g MAX phase Ti$_3$AlC$_2$ powder was added to 18 mL of 40 wt % hydrofluoric acid (HF), which passed nitrogen (N$_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 10% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 10

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 1.00 g MAX phase Ti$_3$AlC$_2$ powder was added to 18 mL of 40 wt % hydrofluoric acid (HF), which passed nitrogen (N$_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 50% H$_2$O$_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 11

A novel preparation method of supported titanium-based Fenton-like catalyst for highly reactive and stable catalytic degradation of a series of organic pollutants under the dark filed through the advanced oxidation technology. The method comprising as follows:
(1) A synthesis and delamination of multilayer Ti$_3$C$_2$ were achieved by a liquid exfoliation method using hydrofluoric acid (HF) etching. Briefly, 1.00 g MAX phase Ti$_3$AlC$_2$ powder was added to 18 mL of 40 wt % hydrofluoric acid (HF), which passed nitrogen (N$_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained Ti$_3$C$_2$ powder was freeze-dried for 48 h and stored at 4° C.
(2) Then, the delamination of Ti$_3$C$_2$ was conducted using tetrapropylammonium hydroxide (TPAOH) after HF etching. Briefly, 0.50 g of the previously obtained Ti$_3$C$_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain Ti$_3$C$_2$ MXene powder.
(3) In the process, 0.10 g previously obtained Ti$_3$C$_2$ MXene dry powder was dispersed in 10 mL deionized water by magnetic stirring near room temperature (30° C.) for 10 min. Then 1 mL, 30% H$_2$O$_2$ was added, kept below 277 K under ice-water bath for 60 min, the resulting dispersion was centrifuged for 20 min at 8000 rpm, and a supernatant of the final products was gently decanted to obtain the supported titanium-based Fenton-like catalyst.

Example 12

A novel preparation method of supported titanium-based Fenton-like catalyst for highly reactive and stable catalytic degradation of a series of organic pollutants under the dark filed through the advanced oxidation technology. The method comprising as follows:

(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.

(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.

(3) In the process, 0.10 g previously obtained $Ti_3C_2$ MXene dry powder was dispersed in 10 mL deionized water by magnetic stirring near room temperature (30° C.) for 10 min. Then 0.5 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 13

A novel preparation method of supported titanium-based Fenton-like catalyst for highly reactive and stable catalytic degradation of a series of organic pollutants under the dark filed through the advanced oxidation technology. The method comprising as follows:

(1) A synthesis and delamination of multilayer $Ti_3C_2$ were achieved by a liquid exfoliation method using hydrofluoric acid (HF) etching. Briefly, 1.00 g MAX phase $Ti_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 48 h to remove the Al layer (Rotation speed is 300 rpm). A suspension was then centrifuged, followed by washing with ethanol and deionized water until pH>6. Finally, the obtained $Ti_3C_2$ powder was freeze-dried for 48 h and stored at 4° C.

(2) Then, the delamination of $Ti_3C_2$ was conducted using tetrapropylammonium hydroxide (TPAOH) after HF etching. Briefly, 0.50 g of the previously obtained $Ti_3C_2$ dry powder was stir-mixed with 20 mL TPAOH for 48 h at room temperature, followed by collecting after centrifugation (Rotation speed is 300 rpm) with washing by ethanol and deionized water for three times until pH>6. A final aqueous dispersion was freeze-dried to obtain $Ti_3C_2$ MXene powder.

(3) In the process, 0.10 g previously obtained $Ti_3C_2$ MXene dry powder was dispersed in 10 mL deionized water by magnetic stirring near room temperature (30° C.) for 10 min. Then 5 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported titanium-based Fenton-like catalyst.

Example 14

A novel preparation method of supported vanadium-based Fenton-like catalyst for highly reactive and stable catalytic degradation of a series of organic pollutants under the dark filed through the advanced oxidation technology. The method comprising as follows:

(1) A synthesis and delamination of multilayer $V_2C$ were achieved by a liquid exfoliation method using hydrofluoric acid (HF) etching. Briefly, 1.00 g MAX phase $V_2AlC$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 12 h to remove the Al layer (Rotation speed is 300 rpm). A suspension was then centrifuged, followed by washing with ethanol and deionized water until pH>6. Finally, the obtained $V_2C$ powder was freeze-dried for 48 h and stored at 4° C.

(2) Then, the delamination of $V_2C$ was conducted using tetrapropylammonium hydroxide (TPAOH) after HF etching. Briefly, 0.50 g of the previously obtained $V_2C$ dry powder was stir-mixed with 20 mL TPAOH for 12 h at room temperature, followed by collecting after centrifugation (Rotation speed is 300 rpm) with washing by ethanol and deionized water for three times until pH>6. A final aqueous dispersion was freeze-dried to obtain $V_2C$ MXene powder.

(3) In the process, 0.10 g previously obtained $V_2C$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported vanadium-based Fenton-like catalyst.

Fenton-like catalytic performance was evaluated for ATZ removal via activation of $H_2O_2$. The steps of the degradation reaction were the same as those in Example 1. As the degradation efficiency test, as high as 95% ATZ removal could be achieved in 30 min using 100 ppm supported niobium-based Fenton-like catalyst under the dark conditions.

Example 15

A novel preparation method of supported niobium-based Fenton-like catalyst for highly reactive and stable catalytic degradation of a series of organic pollutants under the dark filed through the advanced oxidation technology. The method comprising as follows:

(1) A synthesis and delamination of multilayer $Nb_2C$ were achieved by a liquid exfoliation method using hydrofluoric acid (HF) etching. Briefly, 1.00 g MAX phase $Nb_2AlC$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 12 h to remove the Al layer (Rotation speed is 300 rpm). The suspension was then centrifuged, followed by washing with ethanol and deionized water until pH>6. Finally, the obtained $Nb_2C$ powder was freeze-dried for 48 h and stored at 4° C.

(2) Then, the delamination of $Nb_2C$ was conducted using tetrapropylammonium hydroxide (TPAOH) after HF etching. Briefly, 0.50 g of the previously obtained $Nb_2C$ dry powder was stir-mixed with 20 mL TPAOH for 12 h at room temperature, followed by collecting after centrifugation (Rotation speed is 300 rpm) with washing by ethanol and deionized water for three times until pH>6. A final aqueous dispersion was freeze-dried to obtain $Nb_2C$ MXene powder.

(3) In the process, 0.10 g previously obtained $Nb_2C$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported niobium-based Fenton-like catalyst.

Fenton-like catalytic performance was evaluated for ATZ removal via activation of $H_2O_2$. The steps of the degradation reaction were the same as those in Example 1. As the degradation efficiency test, as high as 95% ATZ removal could be achieved in 30 min using 100 ppm supported niobium-based Fenton-like catalyst under the dark conditions.

Example 16

A novel preparation method of supported tantalum-based Fenton-like catalyst for highly reactive and stable catalytic degradation of a series of organic pollutants under the dark filed through the advanced oxidation technology. The method comprising as follows:

(1) A synthesis and delamination of multilayer $Ta_2C$ were achieved by a liquid exfoliation method using hydrofluoric acid (HF) etching. Briefly, 1.00 g MAX phase $Ta_2AlC$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 12 h to remove the Al layer (Rotation speed is 300 rpm). A suspension was then centrifuged, followed by washing with ethanol and deionized water until pH>6. Finally, the obtained $Ta_2C$ powder was freeze-dried for 48 h and stored at 4° C.

(2) Then, the delamination of $Ta_2C$ was conducted using tetrapropylammonium hydroxide (TPAOH) after HF etching. Briefly, 0.50 g of the previously obtained $Ta_2C$ dry powder was stir-mixed with 20 mL TPAOH for 12 h at room temperature, followed by collecting after centrifugation (Rotation speed is 300 rpm) with washing by ethanol and deionized water for three times until pH>6. A final aqueous dispersion was freeze-dried to obtain $Ta_2C$ MXene powder.

(3) In the process, 0.10 g previously obtained $Ta_2C$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported tantalum-based Fenton-like catalyst.

Fenton-like catalytic performance was evaluated for ATZ removal via activation of $H_2O_2$. The steps of the degradation reaction were the same as those in Example 1. As the degradation efficiency test, as high as 95% ATZ removal could be achieved in 30 min using 100 ppm supported tantalum-based Fenton-like catalyst under the dark conditions.

Example 17

A novel preparation method of supported molybdenum-based Fenton-like catalyst for highly reactive and stable catalytic degradation of a series of organic pollutants under the dark filed through the advanced oxidation technology. The method comprising as follows:

(1) A synthesis and delamination of multilayer $Mo_3C_2$ were achieved by a liquid exfoliation method using hydrofluoric acid (HF) etching. Briefly, 1.00 g MAX phase $Mo_3AlC_2$ powder was added to 18 mL of 40 wt % hydrofluoric acid (HF), which passed nitrogen ($N_2$) into the system for 30 min, aiming to exhaust oxygen and prevent oxidation, at room temperature along with magnetic stirring for 12 h to remove the Al layer (Rotation speed is 300 rpm). A suspension was then centrifuged, followed by washing with ethanol and deionized water until pH>6. Finally, the obtained $Mo_3C_2$ powder was freeze-dried for 48 h and stored at 4° C.

(2) Then, the delamination of $Mo_3C_2$ was conducted using tetrapropylammonium hydroxide (TPAOH) after HF etching. Briefly, 0.50 g of the previously obtained $Mo_3C_2$ dry powder was stir-mixed with 20 mL TPAOH for 12 h at room temperature, followed by collecting after centrifugation (Rotation speed is 300 rpm) with washing by ethanol and deionized water for three times until pH>6. A final aqueous dispersion was freeze-dried to obtain $Mo_3C_2$ MXene powder.

(3) In the process, 0.10 g previously obtained $Mo_3C_2$ MXene dry powder was dispersed in 10 mL deionized water by magnetic stirring near room temperature (30° C.) for 10 min. Then 1 mL, 30% $H_2O_2$ was added, kept below 277 K under ice-water bath for 30 min, the resulting dispersion was centrifuged for 20 min at 8000 rpm, and a supernatant of the final products was gently decanted to obtain the supported molybdenum-based Fenton-like catalyst.

Fenton-like catalytic performance was evaluated for ATZ removal via activation of $H_2O_2$. The steps of the degradation reaction were the same as those in Example 1. As the degradation efficiency test, as high as 95% ATZ removal could be achieved in 30 min using 100 ppm supported molybdenum-based Fenton-like catalyst under the dark conditions.

While example embodiments have been described with reference to the figures, it is to be understood that the present invention is not limited to the embodiments described above, encompasses any embodiments within the scope of the following claims.

What is claimed is:

1. A synthesis method of supported two-dimensional transition metal, Fenton catalysts, the method comprising as follows:
   (1) preparing two-dimensional transition metal carbide powders;
   (2) dispersing the two-dimensional transition metal carbide powders into intercalants solution to perform an intercalation reaction, and then centrifuging, washing, and freeze-drying to obtain intercalated products;
   (3) dispersing a certain quality previously obtained intercalated products into ultrapure water and heating for a pre-reacted mixed solution, and then adding hydrogen peroxide solution to the pre-reacted mixed solution under ice-water bath for secondary etching, resting, centrifuging and gently decanting a supernatant to obtain the final Fenton catalysts.

2. The method of claim 1, wherein the transition metal in the catalyst is a variable valence transition metal element, selected from one or more of Ti, V, Nb, Mo, or Ta.

3. The method of claim 1, wherein in step (1), a method for preparing the two-dimensional transition metal carbide powders comprises:

adding a ternary layered MAX phase ceramic material to hydrofluoric acid (HF) at room temperature along with magnetic stirring to remove the Al layer, wherein nitrogen ($N_2$) is passed into a system, aiming to exhaust oxygen and prevent oxidation;

centrifuging a suspension;

washing with ethanol and deionized water; and freeze-drying to obtain the two-dimensional transition metal carbide powders.

4. The method of claim 3, wherein in step (1), a mass-volume ratio of the ternary layered MAX phase ceramic material and the hydrofluoric acid solution is 1-10 g:18-100 mL;

a mass concentration of the hydrofluoric acid solution is 10%-49%;

the etching reaction is at room temperature along with magnetic stirring for 12-120 h; and the obtained two-dimensional transition metal carbide powders are freeze-dried under the condition of −30° C.-50° C. for 48-60 h.

5. The method of claim 1, wherein in step (2), a mass-volume ratio of the two-dimensional transition metal carbide powders and the intercalants solution is 0.5-10 g:20-50 mL;

the intercalants solution is tetrapropylammonium hydroxide solution;

a mass concentration of the tetrapropylammonium hydroxide solution is 20%-50%;

the intercalation reaction is at room temperature along with magnetic stirring for 12-72 h; and the obtained intercalated products are freeze-dried under the condition of −30° C.-50° C. for 48-60 h.

6. The method of claim 1, wherein in step (3), a mass-volume ratio of the intercalated products and the ultrapure water is 0.05-0.5 g:10-50 mL;

a mass-volume ratio of the intercalated products and the hydrogen peroxide solution is 0.05-0.5 g:0.5-5 mL; and a mass concentration of the hydrogen peroxide solution is 10%-50%.

7. The method of claim 1, wherein in step (3), the pre-reacted mixed solution is heated in an oil bath along with magnetic stirring for 10-30 min, and a reaction temperature is 30-50° C.

8. The method of claim 1, wherein in step (3), a resting time is 30-60 min.

9. The method of claim 1, wherein a speed of the centrifugation is 8000-12000 rpm, and a centrifugation time is 10-30 min.

10. A supported two-dimensional transition metal carbide Fenton catalyst obtained by the method of claim 1, wherein the catalyst is used for a catalytic degradation of organic pollutants in water or soil mediums under dark conditions.

* * * * *